(12) United States Patent
Lee et al.

(10) Patent No.: US 9,949,145 B2
(45) Date of Patent: Apr. 17, 2018

(54) DISCONTINUOUS RECEPTION SUPPORTING METHOD IN WIRELESS COMMUNICATION SYSTEM SUPPORTING CHANGE OF USAGE OF RADIO RESOURCE AND APPARATUS THEREFOR

(71) Applicant: LG ELECTRONICS INC., Seoul (KR)

(72) Inventors: Seungmin Lee, Seoul (KR); Hanbyul Seo, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/915,854

(22) PCT Filed: Sep. 15, 2014

(86) PCT No.: PCT/KR2014/008559
§ 371 (c)(1),
(2) Date: Mar. 1, 2016

(87) PCT Pub. No.: WO2015/037956
PCT Pub. Date: Mar. 19, 2015

(65) Prior Publication Data
US 2016/0219443 A1 Jul. 28, 2016

Related U.S. Application Data

(60) Provisional application No. 61/878,027, filed on Sep. 15, 2013.

(51) Int. Cl.
*H04W 24/02* (2009.01)
*H04W 56/00* (2009.01)
(Continued)

(52) U.S. Cl.
CPC .......... *H04W 24/02* (2013.01); *H04W 56/00* (2013.01); *H04W 72/0446* (2013.01);
(Continued)

(58) Field of Classification Search
CPC . H04W 24/02; H04W 56/00; H04W 72/0446; H04W 74/006; H04W 76/048
See application file for complete search history.

(56) References Cited

U.S. PATENT DOCUMENTS 9,325,480 B2* 4/2016 Narasimha ............ H04L 5/0058
2011/0237231 A1* 9/2011 Horneman .......... H04W 76/048
455/414.1
(Continued)

FOREIGN PATENT DOCUMENTS

WO    WO 2013/104084 A1    7/2013

*Primary Examiner* — Chi H Pham
*Assistant Examiner* — Weibin Huang
(74) *Attorney, Agent, or Firm* — Birch, Stewart, Kolasch & Birch, LLP

(57) ABSTRACT

A method of monitoring a downlink control channel by a user equipment performing D2D (device-to-device) communication in a wireless communication system, and a user equipment therefore are discussed. The method according to an embodiment includes receiving information of a plurality of first subframes for counting a DRX (discontinuous reception) timer via a high layer signaling, the first subframes being located so as not to overlap with second subframes for D2D signal transmission; monitoring the downlink control channel at the plurality of first subframes; and counting the DRX timer, when the monitoring the downlink control channel is performed on the plurality of first subframes.

7 Claims, 19 Drawing Sheets

(51) Int. Cl.
*H04W 72/04* (2009.01)
*H04W 74/00* (2009.01)
*H04W 76/04* (2009.01)
*H04W 76/02* (2009.01)

(52) U.S. Cl.
CPC ....... *H04W 74/006* (2013.01); *H04W 76/048* (2013.01); *H04W 76/023* (2013.01)

(56) References Cited

U.S. PATENT DOCUMENTS

| | | | | |
|---|---|---|---|---|
| 2011/0268004 A1* | 11/2011 | Doppler | ................ | H04W 72/02 370/311 |
| 2013/0122893 A1* | 5/2013 | Turtinen | ............... | H04W 8/005 455/423 |
| 2013/0170398 A1* | 7/2013 | Kwon | ................... | H04W 8/005 370/255 |
| 2015/0009910 A1* | 1/2015 | Ryu | ...................... | H04W 72/04 370/329 |

* cited by examiner

FIG. 2
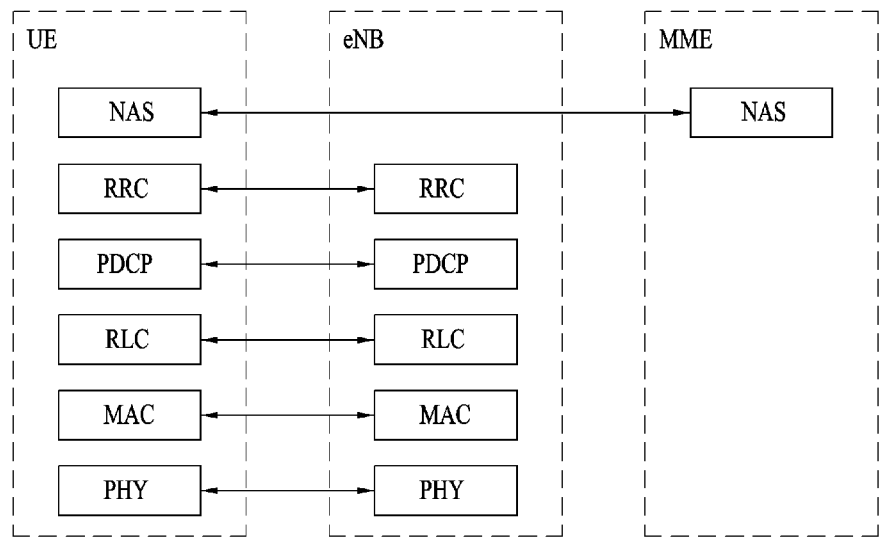
(a) Control-plane protocol stack
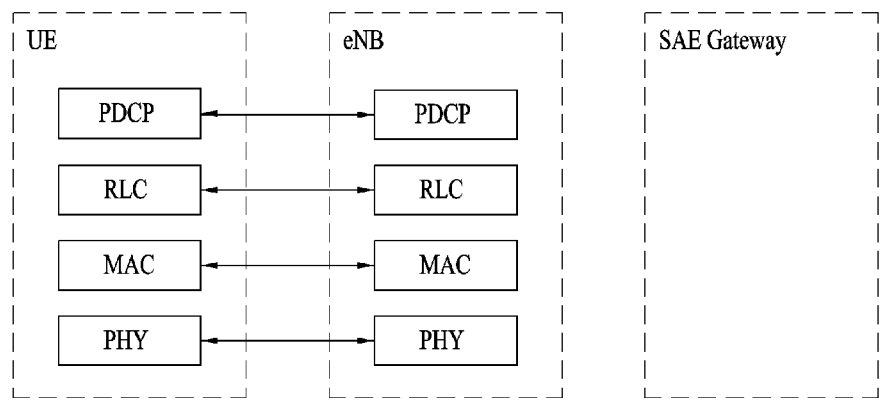
(b) User-plane protocol stack FIG. 9
(a)
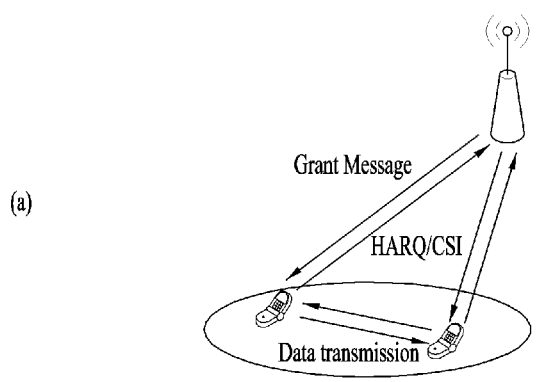
(b)
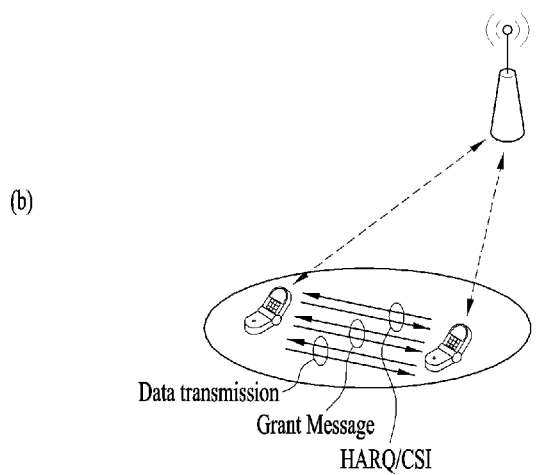

FIG. 10
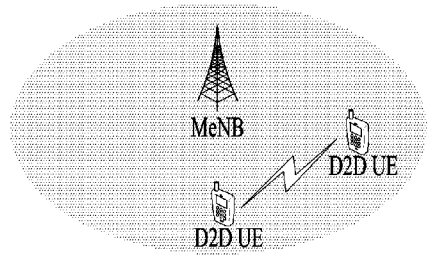
(a) Case that D2D UEs performing D2D communication are within network coverage
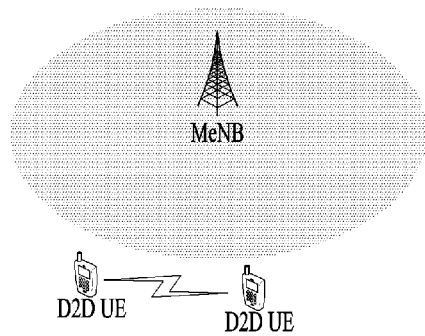
(b) Case that D2D UEs performing D2D communication are out of network coverage
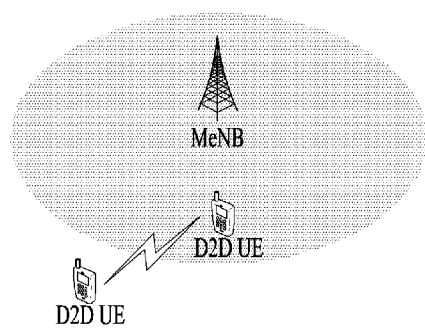
(c) Case that some D2D UEs performing D2D communication are within network coverage and other D2D UEs are out of network coverage FIG. 14
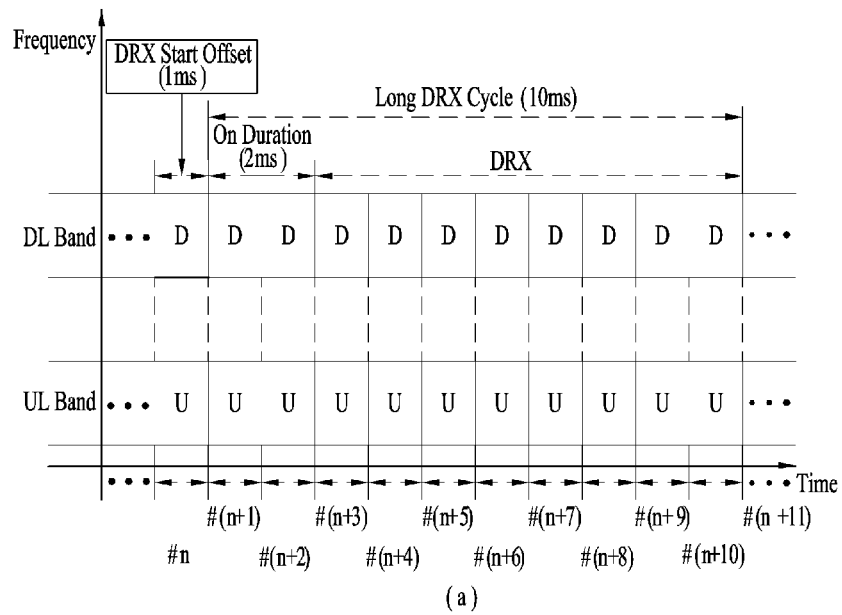
(a)
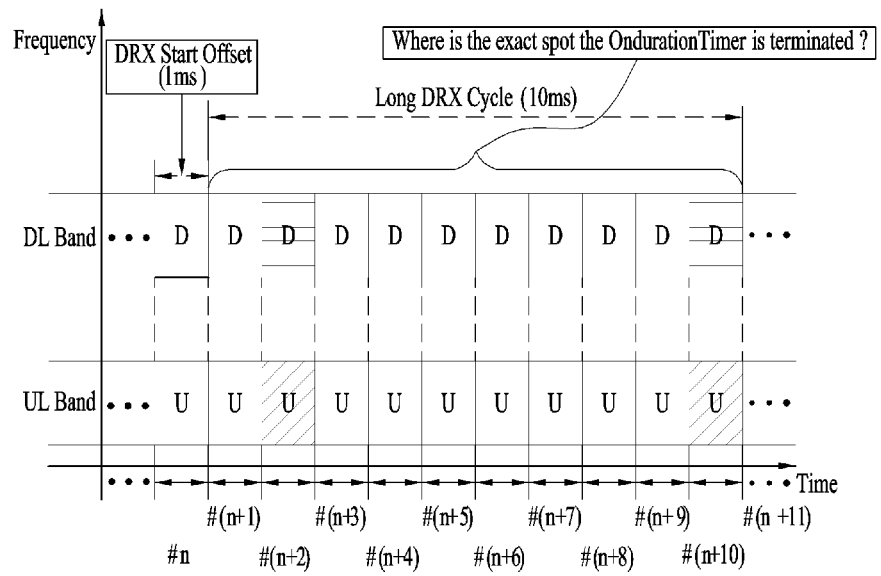
(b)
 Subframe on which D2D communication reception operation is performed
 Point in which PDCCH monitoring is impossible

DISCONTINUOUS RECEPTION SUPPORTING METHOD IN WIRELESS COMMUNICATION SYSTEM SUPPORTING CHANGE OF USAGE OF RADIO RESOURCE AND APPARATUS THEREFOR

CROSS REFERENCE TO RELATED APPLICATIONS:

This application is the National Phase of PCT/KR2014/008559 filed on Sep. 15, 2014, which claims priority under 35 U.S.C. 119(e) to U.S. Provisional Application No. 61/878,027 filed on Sep. 15, 2013, all of which are hereby expressly incorporated by reference into the present application.

TECHNICAL FIELD

The present invention relates to a wireless communication system, and more particularly, to a method of supporting discontinuous reception in a wireless communication system supporting usage change of a radio resource and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE OF THE INVENTION

Technical Task

Based on the above-described discussion, a method of supporting discontinuous reception in a wireless communication system supporting usage change of a radio resource and apparatus therefor are proposed.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of monitoring a downlink control channel by a user equipment performing D2D (device-to-device) communication in a wireless communication system, including the step of receiving the downlink control channel, wherein the downlink control channel is monitored based on a timer performed in accordance with a DRX (discontinuous reception) operation and wherein the timer is counted based on a $2^{nd}$ subframe configured not to overlap with a $1^{st}$ subframe configured for the D2D communication.

Further, in the $2^{nd}$ subframe, the downlink control channel is transmitted.

Further, the $1^{st}$ subframe includes at least one of a subframe for D2D signal reception and a subframe for D2D signal transmission. Preferably, the subframe for the D2D signal transmission is determined by applying a timing advance (TA).

Further, the timer is one selected from the group consisting of an onDurationTimer, a drx-InactivityTimer and a drx-RetransmissionTimer.

Further, a location of the $2^{nd}$ subframe is indicated by a base station.

Further, a DRX cycle interval is extended according to the number of $1^{st}$ subframes.

Further, the timer is one selected from the group consisting of a drxShortCycleTimer, an HARQ round trip timer, an HARQ RTT timer, a mac-ContentionResolutionTimer, a shortDRX-Cycle, a longDRX-Cycle, and a drxStartOffset.

Further, a stop operation of the timer is determined according to a DRX command MAC control element and the DRX command MAC control element is received in only the $2^{nd}$ subframe.

In a $2^{nd}$ technical aspect of the present invention, provided herein is a user equipment configured to monitor a downlink control channel and to perform D2D (device-to-device) communication in a wireless communication system, including a radio frequency unit and a processor, wherein the processor is configured to receive the downlink control channel, wherein the downlink control channel is monitored based on a timer performed in accordance with a DRX (discontinuous reception) operation, and wherein the timer is counted based on a $2^{nd}$ subframe configured not to overlap with a $1^{st}$ subframe configured for the D2D communication.

Advantageous Effects

According to an embodiment of the present invention, discontinuous reception can be efficiently supported in a wireless communication system supporting usage change of a radio resource.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates structures of control and user planes of a radio interface protocol between a user equipment and E-UTRAN based on 3GPP radio access network standard.

FIG. 9 is a reference diagram to describe D2D (UE-to-UE) communication.

FIG. 10 is a reference diagram to describe scenarios for performing D2D communication.

FIG. 14 is a reference diagram to describe a case in which an ambiguity problem of how to count DRX operation related specific timers occurs.

BEST MODE FOR INVENTION

Figure 1:
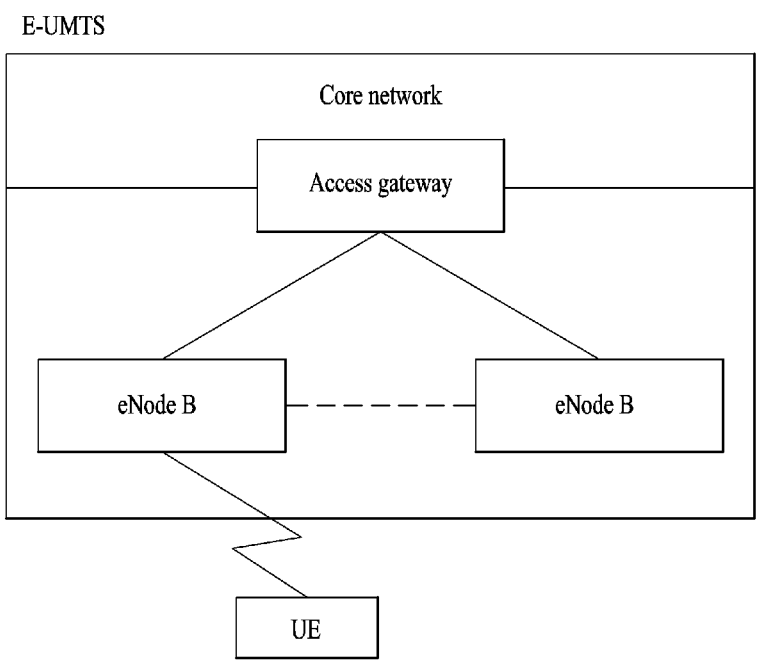
FIG. 1 is a schematic diagram of an E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
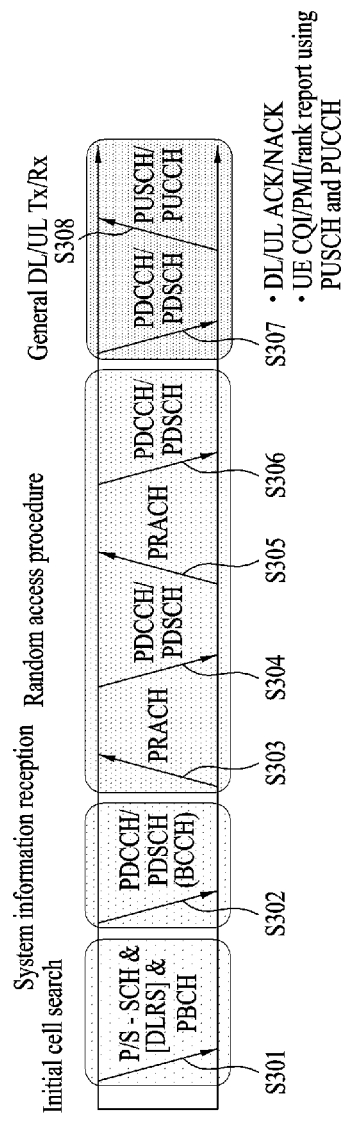
FIG. 3 illustrates physical channels used for a 3GPP LTE system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
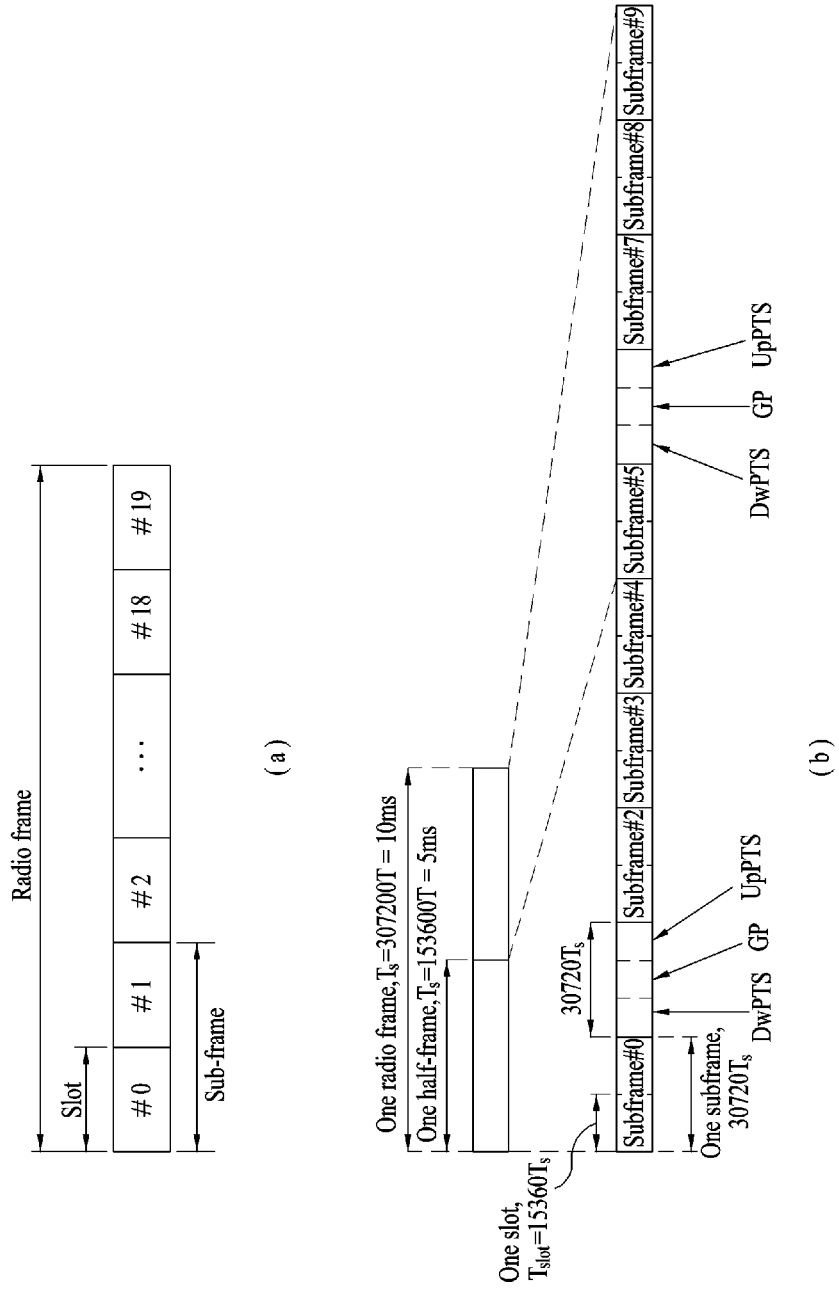
FIG. 4 illustrates a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
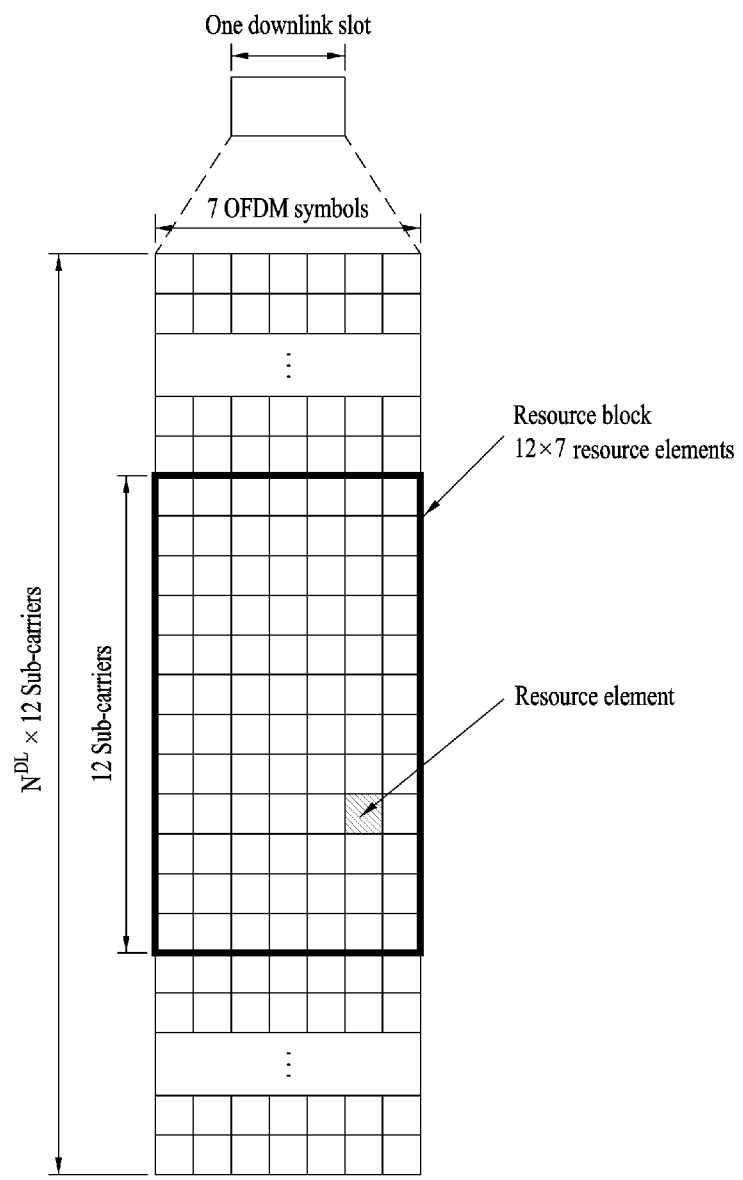
FIG. 5 illustrates a resource grid for a downlink slot.

FIG. 5 illustrates a resource grid for a DL slot.

Referring to FIG. 5, a DL slot includes $N_{symb}^{DL}$ OFDM symbols in the time domain and $N_{RB}^{DL}$ resource blocks (RBs) in the frequency domain. Since each RB includes $N_{sc}^{RB}$ subcarriers, a DL slot includes $N_{RB}^{DL} \times N_{sc}^{RB}$ subcarriers in the frequency domain. While FIG. 5 illustrates that a DL slot includes 7 OFDM symbols and an RB includes 12 subcarriers, embodiments of the present invention are not limited thereto. For example, the number of OFDM symbols included in a DL slot may be changed according to the length of a cyclic prefix (CP).

Each element in the resource grid is referred to as a resource element (RE). Each RE is indicated by an OFDM symbol index and a subcarrier index. One RB consists of $N_{symb}^{DL} \times N_{sc}^{RB}$ REs. The number of RBs ($N_{RB}^{DL}$) included in a DL slot depends on a DL transmission bandwidth set in a cell.

Figure 6:
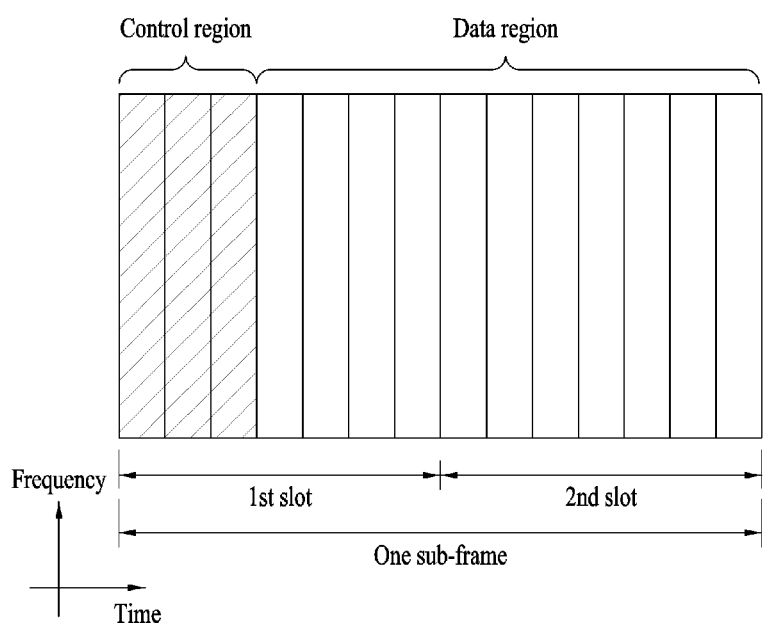
FIG. 6 illustrates a structure of a downlink subframe.

FIG. 6 illustrates the structure of a DL subframe.

Referring to FIG. 6, up to three or four OFDM symbols positioned at the front part of the first slot in a subframe correspond to a control region to which control channels are allocated. The other OFDM symbols in the subframe correspond to a data region to which a physical downlink shared channel (PDSCH) is allocated. Examples of the aquifer

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | channels used in LTE include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH carries a HARQ acknowledgment (ACK)/negative-acknowledgment (NACK) signal in response to UL transmission HARQ ACK/NACK.

Control information carried on the PDCCH is called downlink control information (DCI). The DCI includes resource allocation information and other control information for a UE or a UE group. For example, the DCI includes DL/UL scheduling information, UL transmit (Tx) power control commands, etc.

The PDCCH carries information about resource allocation and a transmission format for a downlink shared channel (DL-SCH), information about resource allocation and a transmission format for an uplink shared channel (UL-SCH), paging information on a paging channel (PCH), system information on the DL-SCH, information about resource allocation for a higher-layer control message such as a random access response transmitted on the PDSCH, a Tx power control command set for individual UEs in a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregation of one or more consecutive control channel elements (CCEs). A CCE is a logical allocation unit used to provide a PDCCH with a coding rate based on the state of a radio channel. A CCE corresponds to a plurality of resource element groups (REGs). The format of a PDCCH and the number of PDCCH bits are determined according to the number of CCEs. An eNB determines a PDCCH format according to DCI transmitted to a UE and adds cyclic redundancy check (CRC) to control information. The CRC is masked with an identifier (ID) (e.g. a radio network temporary identifier (RNTI)) according to the owner or use of the PDCCH. For example, if the PDCCH is intended for a specific UE, the CRC may be masked with the ID (e.g., cell-RNTI (C-RNTI)) of the specific UE. If the PDCCH is intended for a paging message, the CRC thereof may be masked with a paging ID (e.g., paging-RNTI (P-RNTI)). If the PDCCH is intended for system information (particularly, a system information block (SIB)), the CRC thereof may be masked with a system information RNTI (SI-RNTI). If the PDCCH is intended for a random access response, the CRC thereof may be masked with a random access-RNTI (RA-RNTI).

Figure 7:
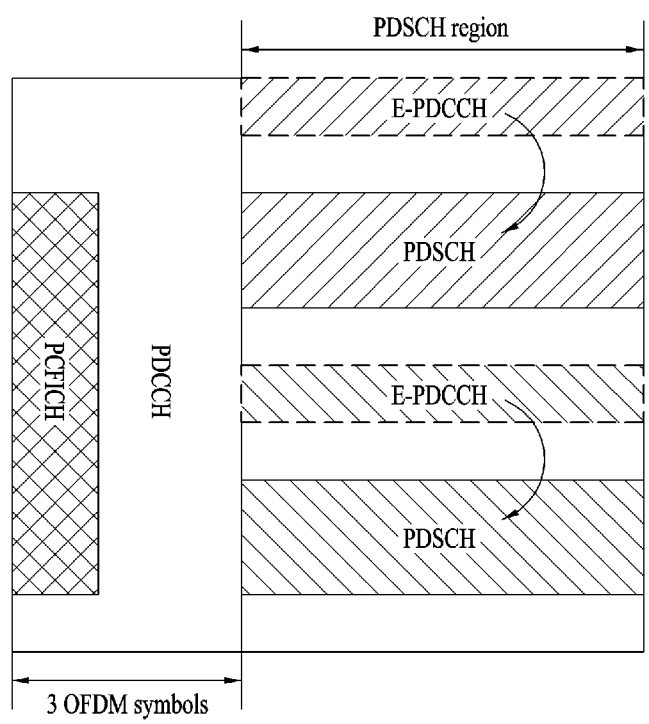
FIG. 7 illustrates EPDCCH and PDSCH scheduled by the EPDCCH.

FIG. 7 illustrates EPDCCH and PDSCH scheduled by the EPDCCH.

Referring to FIG. 7, in general, EPDCCH can be used by defining a portion of a PDSCH region for transmitting data and a user equipment should perform a blind decoding procedure for detecting whether EPDCCH of the user equipment is present. If the number of user equipment that access a node such as RRH while performing the same scheduling operation (i.e., PDSCH and PUSCH control) as legacy PDCCH, a large number of EPDCCHs are allocated to the PDSCH region, whereby the number of times of blind decoding to be performed by the user equipments is increased. Thus, the EPDCCH may have a disadvantage.

Hereinafter, discontinuous reception (DRX) will be described.

To reduce battery consumption of a UE, the UE may be configured to perform a DRX operation and/or a DTX operation. A UE operating in DRX mode repeatedly turns on and off reception capabilities thereof and a UE operating in DTX mode repeatedly turns on and off transmission capabilities thereof. The present invention relates to the DRX operation and thus details of the DRX operation will be described below. First of all, in describing the embodiments of the present invention related to DRX, terms are defined as follows.

Active Time: This is a DRX related time during which a UE monitors PDCCH in a PDCCH-subframe.

mac-ContentionResolutionTimer: This is a parameter for specifying the number of consecutive subframe(s) in which a UE should monitor PDCCH after Msg3 transmission.

DRX Cycle: This is a parameter for specifying the periodic repetition of On Duration accompanied with a possible period of inactivity.

drx-InactivityTimer: This is a parameter for specifying the number of consecutive PDCCH-subframe(s) after successfully decoding PDCCH that indicates initial UL or DL user data transmission for a UE.

drx-RetransmissionTimer: This is a parameter for specifying the maximum number of PDCCH-subframe(s) in which DL retransmission is expected by a UE.

drxShortCycleTimer: This is a parameter for specifying the number of consecutive subframe(s) in which a UE should follow a short DRX cycle.

drxStartOffset: This is a parameter for specifying a subframe at which DRX cycle starts HARQ round trip time (RTT) Timer: This is a parameter for specifying the minimum number of subframes before DL HARQ retransmission expected by a UE.

Msg3: As a part of a random access procedure, this is a message transmitted on a UL-SCH (uplink shared channel) including a cell C-RNTI MAC (medium access control) CE (control element) or CCCH (common control channel) SDU (service data unit), which is provided by a higher layer and associated with a UE contention resolution identity.

onDurationTimer: This specifies the number of consecutive PDCCH-subframe(s) at the beginning of a DRX cycle.

PDCCH-subframe: This means a subframe with PDCCH or a subframe with R-PDCCH for a relay node (RN) having R-PDCCH, which is configured but not suspended. With regard to FDD UE behavior, the PDCCH-subframe may represent any random subframe. On the other hand, with regard to TDD UE behavior, the PDCCH-subframe may represent only a DL subframe and a subframe including DwPTS. In addition, with regard to RNs with an RN subframe configuration that is configured but not suspended, in communication between RN and E-UTRAN, the PDCCH-subframe may represent all DL subframes configured for RN communication with the E-UTRAN.

Once each of the above-mentioned timers starts, it is continuously running until it stops or expires. Otherwise, it is not running. The timer can be started if it is not running or restarted if it is running. The timer is always started or restarted from its initial value.

The DRX means to a scheme of enabling a UE to discontinuously receive a DL channel in order for the UE to reduce battery consumption. For example, if the DRX is configured, a UE attempts to receive PDCCH only in a determined time interval and does not attempt to receive the PDCCH in the rest of time intervals. In this case, the time interval in which a UE should attempt to receive PDCCH is referred to as On Duration and this On Duration is defined once in each DRX cycle.

A UE attempts to receive PDCCH at least during On Duration within one DRX cycle and the DRX cycle used in this case is divided into a long DRX cycle and a short DRX cycle according to a length. The long DRX cycle can minimize battery consumption of the UE and the short DRX cycle can minimize a data transmission delay.

IF the UE receives the PDCCH in the On Duration, additional transmission or retransmission may occur in a duration other than the On Duration. Accordingly, the UE needs to attempt PDCCH reception in a time interval in which the additional transmission or retransmission may occur even though the time interval is not the On Duration. In particular, the UE attempts to receive the PDCCH in a time interval in which onDurationTimer for managing On Duration, drx-InactivityTimer for managing inactivity, or drx-RetransmissionTimer for managing retransmission is running. In addition, even if the UE is performing a random access procedure or the UE attempts to receive a UL grant after sending a scheduling request, the UE attempts to receive PDCCH carrying the UL grant. Thus, a time interval in which the UE should attempt to receive the PDCCH is collectively referred to as Active Time. The Active Time includes On Duration in which a UE periodically attempts to receive PDCCH and a time interval during which a UE attempts to receive PDCCH when an event is triggered.

Figure 8:
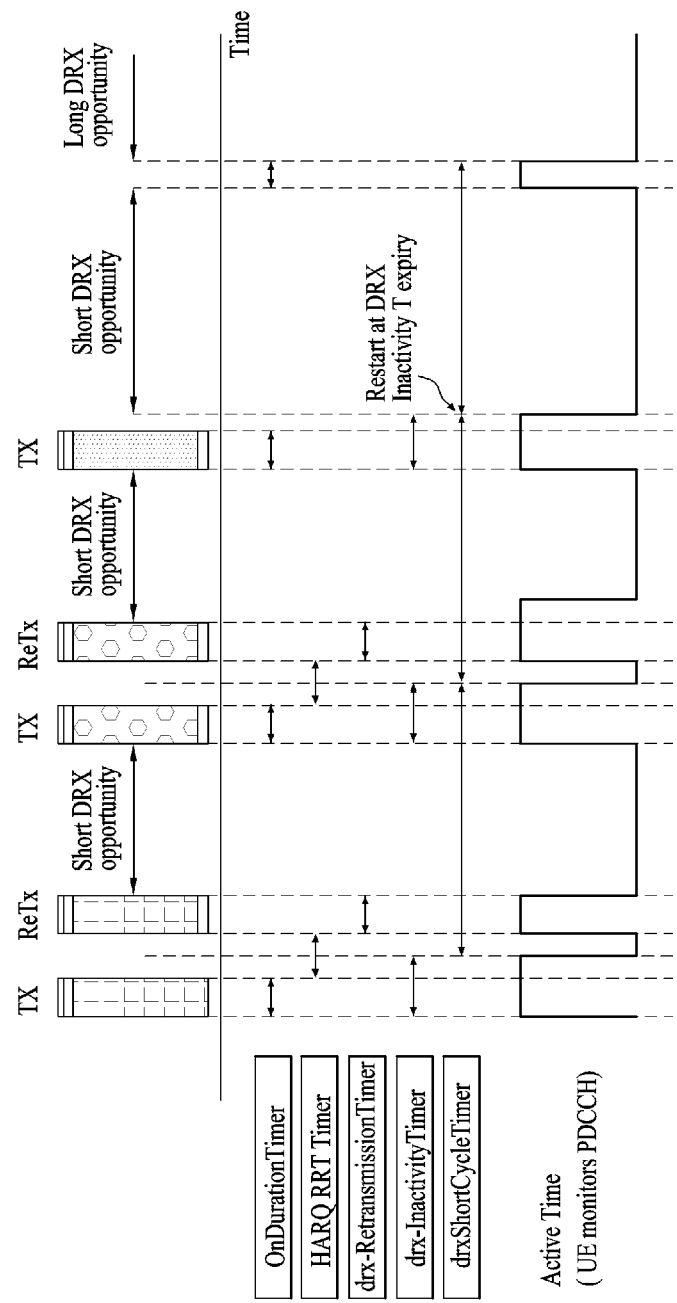
FIG. 8 illustrates a DRX (discontinuous reception) operation in a 3GPP LTE system.

FIG. 8 illustrates a DRX operation in a 3GPP LTE system.

A UE may be configured by RRC with DRX functionality that controls a PDCCH monitoring activity of the UE for C-RNTI (Cell Radio Network Temporary Identifier) corresponding to unique identification information used for identifying RRC connection and scheduling, TPC-PUCCH-RNTI (Transmit Power Control-Physical Uplink Control Channel-RNTI) corresponding to identification information used for power control of PUCCH, TPC-PUSCH-RNTI (Transmit Power Control-Physical Uplink Shared Channel-RNTI) corresponding to identification information used for power control of PUSCH, and (if configured) semi-persistent scheduling C-RNTI corresponding to unique identification information used for semi-static scheduling. In case of a RRC_CONNECTED state, if DRX is configured, the UE is allowed to monitor PDCCH discontinuously using a DRX operation. When using the DRX operation, the UE monitors the PDCCH according to requirements which will be described later. The RRC controls the DRX operation by configuring timers such as onDurationTimer, drx-InactivityTimer, drx-RetransmissionTimer, longDRX-Cycle, drx-StartOffset, drxShortCycleTimer, and shortDRX-Cycle. A HARQ RTT timer is also defined in each DL HARQ process. Only a value of the HARQ RTT timer is fixed to 8 ms and values of the other timers (e.g. onDurationTimer, drx-InactivityTimer, drx-RetransmissionTimer, or mac-ContentionResolutionTimer) are configured by an eNB through RRC signaling. The long DRX cycle and short DRX Cycle are also configured by the eNB through RRC signaling. Meanwhile, the eNB limits CQI/PMI/PTI/RI report of the UE to the On Duration of a DRX Cycle using cqi-Mask, which is a value configured by a higher layer (e.g. RRC layer). The eNB may command the UE to transition to a DRX state by transmitting a DRX command MAC CE (control element) to the UE. As will be described later, upon receiving the DRX command MAC CE from the eNB, the UE transitions to a short DRX state if a short DRX cycle is configured and, otherwise, the UE transitions to a long DRX state. The DRX command MAC CE is identified through a logical channel ID (LCID) of a MAC PDU subheader.

When a DRX cycle is configured, Active Time includes the following time intervals:
 time while onDurationTimer, drx-InactivityTimer, drx-RetransmissionTimer, or mac-ContentionResolutionTimer is running; or
 time while a scheduling request is sent on PUCCH and is pending; or
 time while a UL grant for pending HARQ retransmission can occur and there is data in a corresponding HARQ buffer; or
 time until receiving PDCCH, which indicates initial transmission of new data corresponding to C-RNTI of a UE after successful reception of a random access response with respect to a preamble not selected by the UE.

When DRX is configured, the UE should perform the following operations for each subframe.
 If a HARQ RTT timer expires in this subframe and data in a soft buffer of a corresponding HARQ process has not been successfully decoded:
  start drx-RetransmissionTimer for the corresponding HARQ process.
 If a DRX command MAC control element is received:
  stop on DurationTimer;
  stop drx-InactivityTimer.
 If drx-InactivityTimer expires or a DRX command MAC CE is received in this subframe:
  if Short DRX Cycle is configured:
   start or restart drxShortCycleTimer;
   start Short DRX Cycle.
  Else:
   use Long DRX Cycle.
 If drxShortCycleTimer expires in this subframe:
  use Long DRX Cycle.
 If Short DRX Cycle is used [(SFN*10)+subframe number] modulo (shortDRX-Cycle)=(drxStartOffset) modulo (shortDRX-Cycle); or
 If Long DRX Cycle is used [(SFN*10)+subframe number] modulo (longDRX-Cycle)=drxStartOffset:
  start onDurationTimer.
 During Active Time, for a PDCCH-subframe, if the subframe is not required for UL transmission in a half-duplex FDD UE and if the subframe is not a part of a configured measurement gap:
  monitor PDCCH.
  If the PDCCH indicates DL transmission or if DL assignment has been configured for this subframe:
   start HARQ RTT timer for the corresponding HARQ process;
   stop drx-RetransmissionTimer for the corresponding HARQ process.
  If the PDCCH indicates new (DL or UL) transmission:
   start or restart drx-InactivityTimer.
 When not in Active Time, type-0-triggered SRS should not be reported.
 If CQI masking (cqi-Mask) is setup by a higher layer:
  while on DurationTimer is not running, CQI/PMI/RI/PTI (channel quality indicator/precoding matrix indicator/rank indicator/precoding type indicator) should not be reported.
 Else:
  When not in Active Time, CQI/PMI/RI/PTI on the PUCCH should not be reported.

Regardless of whether a UE monitors PDCCH or not, if it is expected, the UE receives and transmits HARQ feedback and transmits type-1-triggered SRS.

NOTE: A UE may not report CQI/PMI/RI/PTI on PUCCH and/or type-0-triggered SRS transmission optionally in up to 4 subframes appearing after PDCCH that indicates new (UL or DL) transmission. However, the option of not reporting CQI/PMI/RI/PTI and/or type-0-triggered SRS transmission is not applicable to subframes in which onDurationTimer is running.

NOTE: The same Active Time is applied to resources operated in all activated serving carrier(s).

Hereinafter, D2D (UE-to-UE) communication will be described.

D2D communication schemes can be mainly divided into a scheme supported by a network/coordination station (e.g., base station) and a scheme not supported by the network/coordination station.

Referring to FIG. 9, FIG. 9 (a) illustrates a scheme in which the network/coordination station intervenes in transmission and reception of control signal (e.g., grant message), HARQ, channel state information, etc. and user equipments that perform D2D communication transceive data only. On the other hand, FIG. 9 (b) illustrates a scheme in which the network provides minimum information (e.g., D2D connection information available in a corresponding cell) only but the user equipments that perform D2D communication establish links and also transceive data.

Based on the above-mentioned description, explained is a method for a user equipment to perform a discontinuous reception (DRX) operation efficiently in a situation that UE-to-UE communication (i.e., device-to-device communication) is performed.

Hereinafter, for the convenience of the explanation, the present invention will be described based on the 3GPP LTE system. However, the scope of the system to which the present invention is applicable can be extended other systems besides the 3GPP LTE system. Moreover, the embodiments of the present invention can be extensively applied to not only a case that part of a time resource region and/or frequency resource region in the legacy system is assigned for the purpose of D2D communication but also a case that a new time resource region and/or frequency resource region (different from that in the legacy system) is (re)assigned.

Furthermore, the present invention can be extensively applied to not only a case that part of a time resource region and/or frequency resource region in the legacy communication system is assigned for the purpose of D2D communication but also a case that a new time resource region and/or frequency resource region (different from that in the legacy communication system) is (re)assigned.

Additionally, the embodiments of the present invention can be extensively applied to i) a case in which D2D user equipments that perform D2D communication are within coverage of a network (i.e., D2D Discovery/Communication Within Network Coverage), ii) a case in which D2D user equipments that perform D2D communication are out of coverage of a network (i.e., D2D Discovery/Communication Outside Network Coverage (for Public Safety Only)), or iii) a case in which among D2D user equipments that perform D2D communication, some of them are within coverage of a network and the reset of them are out of coverage of a network (D2D Discovery/Communication of Partial Network Coverage).

FIG. 10 illustrates examples of various environments or scenarios in which D2D communication (e.g., DISCOVERY PHASE and/or COMMUNICATION PHASE) is performed.

Referring to FIG. 10, D2D communication can be performed a case in which D2D user equipments that perform D2D communication are within coverage of a network (i.e., D2D Discovery/Communication Within Network Coverage) as shown in FIG. 10 (a), a case in which D2D user equipments that perform D2D communication are out of coverage of a network (i.e., D2D Discovery/Communication Outside Network Coverage (for Public Safety Only)) shown in FIG. 10 (b), or a case in which among D2D user equipments that perform D2D communication, some of them are within coverage of a network and the reset of them are out of coverage of a network (D2D Discovery/Communication of Partial Network Coverage) shown in FIG. 10 (c).

Moreover, a signal transmission/reception procedure and a signal information configuration required for a discovery step and/or communication step may be defined differently for individual environments or scenarios (i.e., FIG. 10 (a) to FIG. 10 (c)).

Hereinafter, for the convenience of the explanation of the present invention, a D2D discovery procedure and synchronization for D2D communication will be described First of all, the D2D discovery procedure is explained. The discovery procedure for D2D communication can be mainly divided into two types of discovery procedures. For example, the two types of the discovery procedures are explained as follows.

Type 1: A case that resources for discovery signal transmission are allocated non-UE specifically—the resources may be for all UEs/group of UEs.

Type 2: A case that resources for discovery signal transmission are allocated UE-specifically —in this case, a resource may be allocated for each discovery signal transmission (Type 2A) or resources may be semi-persistently allocated for discovery signal transmission (Type 2B).

However, the above-mentioned discovery procedures are currently under discussion and additional discussion on an entity, a method and the like for resource allocation is ongoing. Thus, the present invention should not be interpreted as limited to the aforementioned examples.

Secondly, synchronization for D2D communication (i.e., D2D discovery and communication) is explained in the following description. And, assume a case that there is at least one external synchronization reference and it exists at least within network (NW) coverage.

A UE initiates D2D signal transmission in an interval between T1 and T2. In this case, T1 corresponds to a timing of receiving synchronization reference. T2 corresponds to offset and may be one of positive/negative/zero.

Option 1: The synchronization reference may be derived from a timing of a cell. In the Option 1, a case that each cell has different time is not included and a cell used in timing derivation may be UE's serving cell or not. Moreover, T2 may be fixed (option 1.1), be configured by a network (option 1.2), or be derived from a PUSCH transmission timing of a related cell (option 1.3) (The option 1.3 can be applied to only a case that a UE knows the PUSCH timing).

Option 2: The synchronization reference may be a synchronization signal transmitted from one UE. In the option 2, T2 may be fixed (option 2.1) or be obtained through the one UE (option 2.2).

Option 3: The synchronization reference may include synchronization signals transmitted from a plurality of UEs. In the option 3, T2 may be fixed (option 3.1) or be obtained through a plurality of the UEs (option 3.2).

Option 4: The synchronization reference may be transmitted from an external source (e.g., GNSS).

However, the above-mentioned options are provided to help the understanding of the present invention and the present invention should not be interpreted as excluding other options except the aforementioned options.

In addition, the options 1 and 4 are under discussion for a D2D discovery signal within network coverage and the options 2, 3 and 4 are under discussion for a D2D discovery signal out of network coverage. Further, for a D2D communication signal, the above-mentioned options 1, 2, 3 and 4 are considered but the option 1.3 is supported at least in case that it is within network coverage.

The present invention will be explained based on the above-mentioned description. For the convenience of the explanation of the present invention, it is assumed that D2D communication is performed by reusing uplink resources (e.g., some uplink subframes in an uplink band of a FDD system or some uplink subframes in a TDD system) in the legacy system. However, the embodiments/explanations/proposed methods in the present invention can be extensively applied to i) a case that D2D communication is performed by reusing downlink resources in the legacy system and/or ii) a case that D2D communication is performed based on new resources (re)allocated for the D2D communication.

To perform operations of transmitting/receiving D2D signals (e.g., D2D discovery signal, D2D data signal, etc.) between user equipments participating in D2D communication correctly, time synchronization related to D2D signal transmission needs to be defined.

Figure 11:
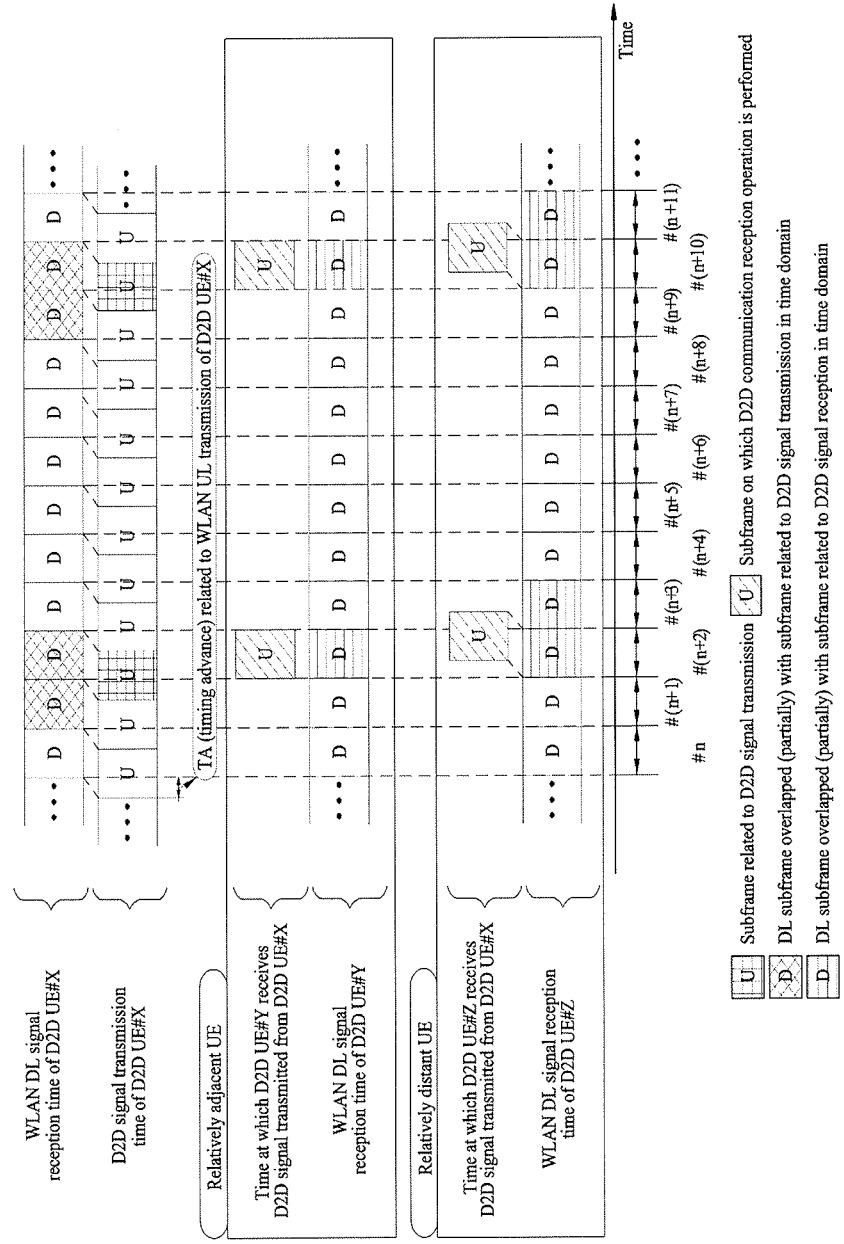
FIG. 11 and FIG. 12 are reference diagrams to describe a case in which time synchronization related to D2D signal transmission (i.e., synchronization for D2D communication) is configured.
Figure 12:
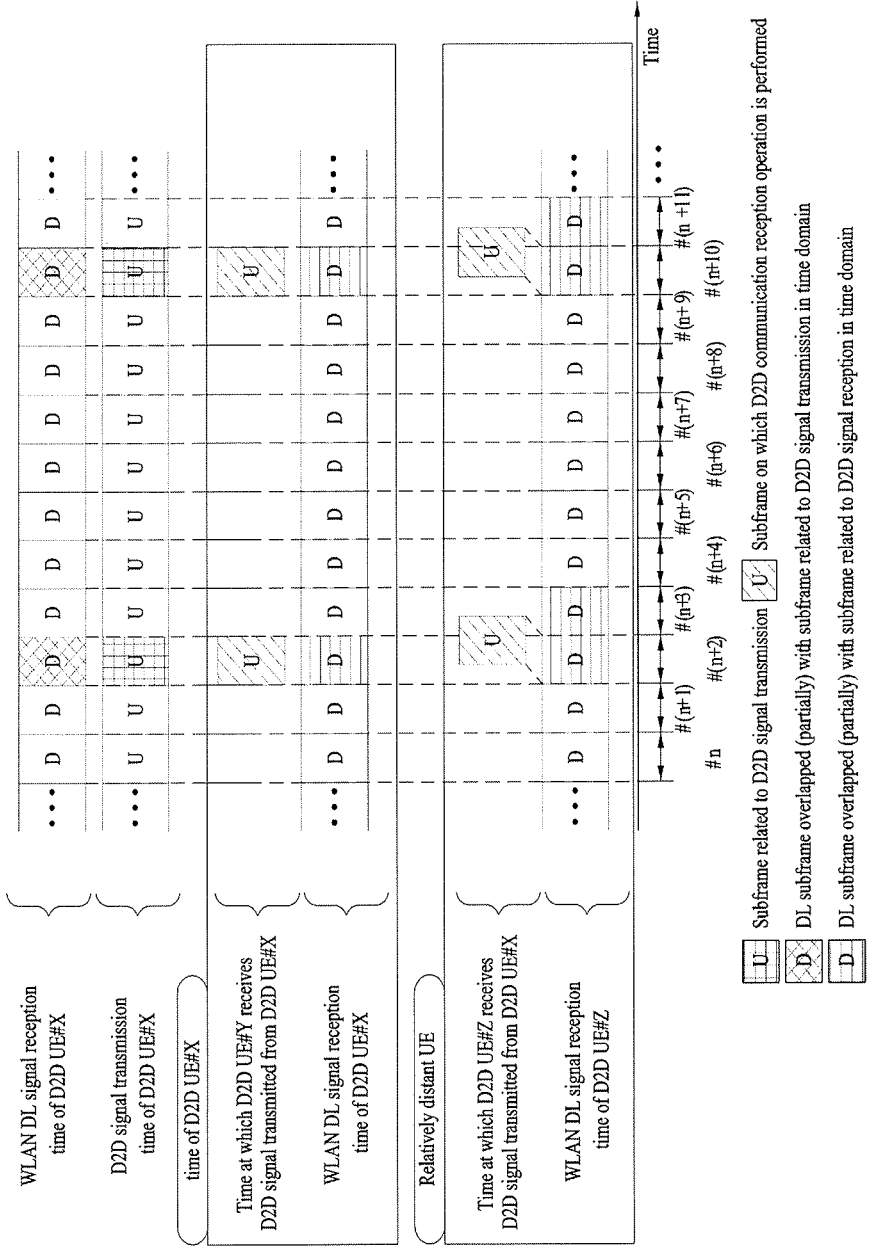

FIG. 11 and FIG. 12 are reference diagrams to describe a case in which time synchronization related to D2D signal transmission (i.e., synchronization for D2D communication) is configured. In FIG. 11 and FIG. 12, it is assumed that some subframes in a UL band of a FDD system are configured for usage of D2D communication (e.g., D2D discover signal transmission/reception usage, D2D data transmission/reception usage).

FIG. 11 illustrates one example (e.g., synchronization reference for D2D communication) of a case in which a user equipment (i.e., D2D UE#X) transmitting a D2D signal transmits the D2D signal (re)using time synchronization (e.g., TA (timing advance)) used for uplink data (WLAN PUSCH) communication with a base station. And, FIG. 12 illustrates one example of a case in which a user equipment (i.e., D2D UE#X) transmitting a D2D signal transmits the D2D signal (re)using time synchronization related to downlink data (WLAN PDSCH) reception from a base station. In FIG. 11 and FIG. 12, it is assumed that time synchronization related to the downlink data (WLAN PDSCH) reception from the base station is identical between the user equipment (i.e., D2D UE#X) transmitting the D2D signal and a user equipment (i.e., D2D UE#Y and D2D UE#Z) receiving the corresponding D2D signal.

As shown in FIG. 11 and FIG. 12, the number and locations of DL subframes which are affected by a reception operation of a D2D signal reception UE (or DL subframes which are overlapped at least partially (i.e., partially or fully) with a subframe related to D2D signal reception in time domain) may be changed depending on a distance between D2D UEs. For instance, as shown in FIG. 12, in case of a D2D signal reception UE (i.e., D2D UE#Y) having a relatively short distance from a D2D signal transmission UE (i.e., D2D UE#X), only DL SF #(n+2) is affected by a reception operation in a corresponding D2D SF #(n+2). On the other hand, in case of a D2D signal reception UE (i.e., D2D UE#Z) having a relatively long distance from the D2D signal transmission UE (i.e., D2D UE#X), both DL SF #(n+2) and DL SF #(n+3) are affected by the reception operation in the corresponding D2D SF #(n+2).

Moreover, as shown in FIG. 11 and FIG. 12, depending on which time synchronization (e.g., (re)use of the time synchronization (e.g., TA) used for uplink data (WLAN PUSCH) communication with the base station or (re)use of the time synchronization related to downlink data (WLAN PDSCH) reception from the base station) is used by the D2D signal transmission UE to transmit the D2D signal, the number and locations of DL subframes which are affected by a transmission operation (or DL subframes which are overlapped at least partially (i.e., partially or fully) with a subframe related to D2D signal transmission in time domain) may be changed. For instance, as shown in FIG. 11, in case that the D2D signal transmission UE (i.e., D2D UE#X) transmits the D2D signal (i.e., D2D SF #(n+2)) (re)using the time synchronization (e.g., TA) used for uplink data (WLAN PUSCH) communication with the base station, both DL SF #(n+1) and DL SF #(n+2) are affected by the corresponding transmission operation. On the other hand, as shown in FIG. 12, in case that the D2D signal transmission UE (i.e., D2D UE#X) transmits the D2D signal (i.e., D2D SF #(n+2)) (re)using the time synchronization related to downlink data (WLAN PDSCH) reception from the base station, only DL SF #(n+2) is affected by the corresponding transmission operation.

Furthermore, the present invention is described in consideration of a receiver of a user equipment performing D2D communication. Two types of receivers can be typically used to implement the receiver of the user equipment performing the D2D communication.

Figure 13:
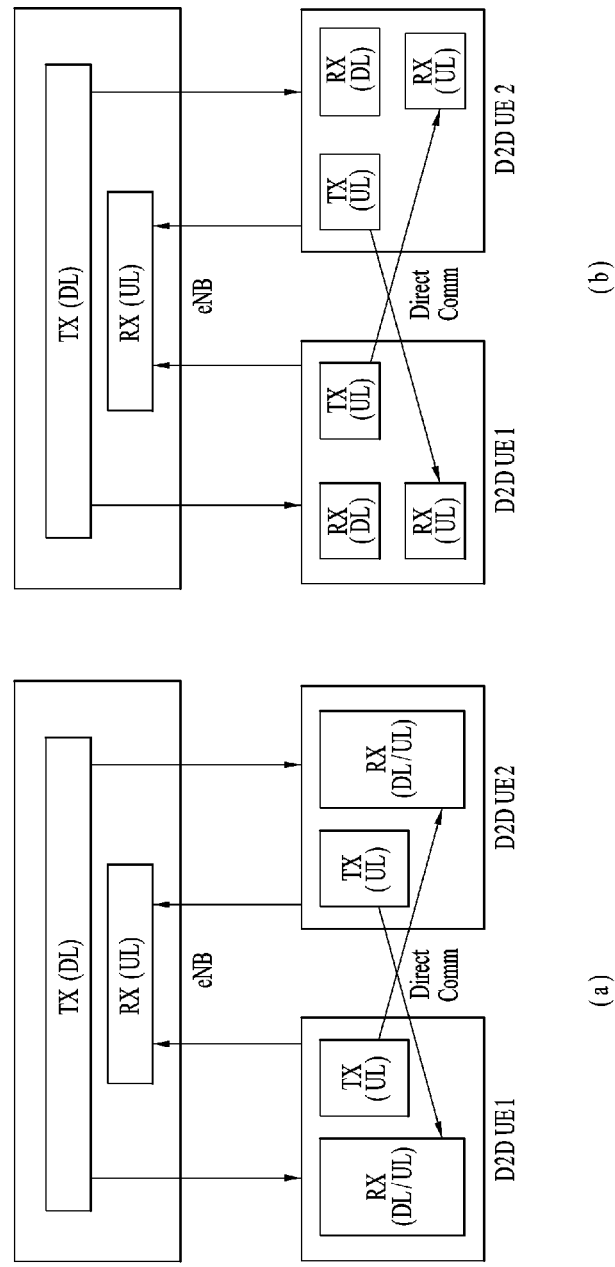
FIG. 13 is a reference diagram to describe a receiving circuit/module in a receiver of a user equipment for performing D2D communication.

FIG. 13 is a reference diagram to describe a receiving circuit/module in a receiver of a user equipment for performing D2D communication.

The first type is a half-duplex D2D receiver. In the half-duplex D2D receiver, RX processing of D2D communication is performed reusing a (modified) receiving circuit/module used in DL communication between a user equipment and a base station. For instance, as shown in FIG. 13 (a), in case that the half-duplex D2D receiver is applied, if some subframes in a UL band of a FDD system are configured for usage of D2D communication (e.g., D2D discover signal transmission/reception usage, D2D data transmission/reception usage) and if a D2D UE should actually perform a D2D signal reception operation (e.g., D2D data reception operation, D2D discovery signal reception operation) in the corresponding subframes, the corresponding D2D UE is unable to receive a DL signal (e.g., PDCCH, PDSCH, etc.) from a base station in subframes, which are overlapped at least partially (e.g., partially or fully), in a DL band.

The second type is a full-duplex D2D receiver. In the full-duplex D2D receiver, RX processing of D2D communication is performed based on a circuit/module for reception in a UL band, which is implemented independently (e.g., separated), instead of a (general) receiving circuit/module used in DL communication between a base station and a user equipment. An example of a case of applying the full-duplex D2D receiver is explained with reference to FIG. 13 (b). If some subframes in a UL band of a FDD system are configured for usage of D2D communication and if a D2D UE should actually perform a D2D signal reception operation (e.g., D2D data reception operation, D2D discovery signal reception operation) in the corresponding subframes, the corresponding D2D UE is able to receive a DL signal (e.g., PDCCH, PDSCH, etc.) from a base station in subframes, which are overlapped at least partially (e.g., partially or fully), in a DL band.

Thus, looking at a DRX operation of a UE in consideration of structures of UEs performing D2D communication, DRX operation related specific timers of the UE are defined to perform counting based on the number of subframes (e.g., all DL subframes in the DL band of the FDD system, a DL subframe and a special subframe including DwPTS in the TDD system) capable of monitoring PDCCH/R-PDCCH as mentioned in the foregoing description. The timers defined so as to perform counting in the above-mentioned manner may include, for example, onDurationTimer, drx-InactivityTimer, drx-RetransmissionTimer and the like.

However, if a specific D2D UE is implemented with the half-duplex D2D receiver in a FDD system environment and if the corresponding D2D UE needs to actually perform the D2D signal reception operation (e.g., D2D data reception operation, D2D discovery signal reception operation) in part of subframes in a preset UL band, PDCCH/R-PDCCH monitoring may not be performed on DL subframes in a DL band at a time overlapped at least partially (e.g., partially or fully). Therefore, in this case, an ambiguity problem of how to count the aforementioned DRX operation related specific timers (e.g., onDurationTimer, drx-InactivityTimer, drx-RetransmissionTimer) may occur.

FIG. 14 illustrates one example to describe a case in which an ambiguity problem of how to count DRX operation related specific timers occurs. In FIG. 14, assume that values of longDRX-Cycle, onDurationTimer, drxStartOffset are set to 10 ms, 2 ms and 1 ms in a FDD system environment, respectively.

FIG. 14 (a) illustrates one example of a case in which subframes in a UL band are not used for a D2D signal reception operation. In this case, a D2D UE is able to perform a normal DRX operation. On the other hand, FIG. 14 (b) illustrates a case in which an ambiguity problem of how to count onDurationTimer related to a DRX operation occurs. In particular, if a D2D UE having a half-duplex D2D receiver performs a D2D signal reception operation on some subframes (i.e., UL SF #(n+2), UL SF #(n+10)) in a UL band, PDCCH/R-PDCCH monitoring cannot be performed on DL subframes (i.e., DL SF #(n+2), DL SF #(n+10)) in a DL band at a time overlapped at least partially (i.e., partially or fully), whereby the ambiguity problem of how to count onDurationTimer related to the DRX operation occurs.

Hence, in case that a specific D2D UE cannot normally monitor a predefined control channel (e.g., PDCCH, EPDCCH, R-PDCCH) in some subframes (e.g., all DL subframes in a DL band of an FDD system, a DL subframe and a special subframe including DwPTS in a TDD system) due to a D2D receiver type (e.g., half-duplex D2D receiver) and/or a D2D communication related reception operation (e.g., D2D data reception operation, D2D discovery signal reception operation) and/or a D2D communication related transmission operation (e.g., D2D data transmission operation, D2D discovery signal transmission operation), a method of efficiently counting DRX operation related specific timers of the corresponding D2D UE is proposed and explained in the following description.

<1$^{st}$ Method>

According to a 1$^{st}$ method of the present invention, DRX operation related specific timers (i.e., onDurationTimer, drx-InactivityTimer, drx-RetransmissionTimer) may be configured to perform counting in consideration of only different timing points of DL subframes (and/or specific subframe including DwPTS), which are not overlapped at least partially (i.e., partially or fully) with subframes configured for usage of D2D communication and a predefined control channel (e.g., PDCCH, EPDCCH, R-PDCCH) is transmitted therein at the same time.

In this case, subframes that are not considered in the counting of the DRX operation related specific timers from the perspective of a D2D UE may be defined to include subframes overlapped at least partially (i.e., partially or fully) with times at which the corresponding D2D UE should actually perform a D2D signal reception operation (e.g., D2D data reception operation, D2D discovery signal reception operation, etc.) and subframes overlapped at least partially (i.e., partially or fully) with times at which the corresponding D2D UE should actually perform a D2D signal transmission operation (e.g., D2D data transmission operation, D2D discovery signal transmission operation, etc.). Referring to FIG. 11, for example, the subframe not considered in the counting of the DRX operation related specific timers may be defined to include the subframes overlapped at least partially with times at which the corresponding D2D UE should actually perform the D2D signal reception operation (e.g., D2D data reception operation, D2D discovery signal reception operation, etc.) (i.e., a reception time of SF #(n+2) is overlapped at least partially with DL SF #(n+2) (i.e., D2D UE#Y) and/or DL SF #(n+2) and DL SF #(n+3) (i.e. D2D UE#Z) in FIG. 11) and the subframes overlapped at least partially with the times at which the D2D signal transmission (e.g., D2D data transmission operation, D2D discovery signal transmission operation) should be performed (i.e., a transmission time of D2D SF #(n+2) is overlapped at least partially (i.e., partially or fully) with DL SF #(n+1) and DL SF #(n+2) in FIG. 11 and a transmission time of D2D SF #(n+2) is overlapped at least partially with DL SF #(n+1) in FIG. 12).

Moreover, for example, in case that the subframes overlapped at least partially (i.e., partially or fully) with the times at which the D2D signal transmission operation should be performed are configured not to be considered in the counting of the DRX operation related specific timers, it is assumed that D2D communication is performed based on uplink resources in the system and that the D2D signal transmission operation is performed in consideration of (or (re)using) TA (timing advance) (i.e., WLAN UL) related UL communication (of the D2D UE). In this case, due to the corresponding TA, partial overlapping phenomenon may occur between a DL subframe and a UL subframe (e.g., the transmission time of D2D SF #(n+2) is overlapped at least partially (i.e., partially or fully) with DL SF #(n+1) and DL SF #(n+2) in FIG. 11). Therefore, not only the subframe (e.g., DL SF #(n+2) in FIG. 11) on which the D2D signal transmission operation is actually performed but also some subframes (e.g., DL SF #(n+1) in FIG. 11) before and/or after with reference to the corresponding subframe may not be considered in the counting of the DRX operation related specific timers additionally.

As another example, the subframes not considered in the counting of the DRX operation related specific timers from the perspective of the D2D UE can be limited to the subframes overlapped at least partially (i.e., partially or fully) with the times at which the corresponding D2D UE should actually perform the D2D signal reception operation (e.g., D2D data reception operation, D2D discovery signal reception operation, etc.) among subframes configured for usage of D2D communication. In other words, among the subframes configured for the purpose of D2D communication, the subframes overlapped at least partially (i.e., partially or fully) with the times at which the corresponding D2D UE should actually perform the D2D signal transmission operation (e.g., D2D data transmission operation, D2D discovery signal transmission operation, etc.) are still considered in the counting of the DRX operation related specific timers of the corresponding D2D UE. For instance, even if a D2D UE is implemented with a half-duplex D2D receiver, the D2D UE may use the receiver to monitor a predefined control channel in the subframes overlapped at least partially (i.e., partially or fully) with the times at which the corresponding D2D UE should actually perform the D2D signal transmission operation by changing usage of the receiver.

Moreover, if the present $1^{st}$ method is applied, a D2D UE may be configured to actually perform an operation of monitoring a predefined control channel (e.g., PDCCH, EPDCCH, R-PDCCH, etc.) only in locations of subframes considered in counting of DRX operation related specific timers (i.e., onDurationTimer, drx-InactivityTimer, drx-RetransmissionTimer).

Additionally, when the present $1^{st}$ method is applied, a base station may be configured to transmit each of the predefined control channels (e.g., PDCCH, EPDCCH, R-PDCCH, etc.) by considering locations of subframes considered in counting of DRX operation related specific timers (i.e., onDurationTimer, drx-InactivityTimer, drx-RetransmissionTimer) of individual D2D UEs.

Figure 15:
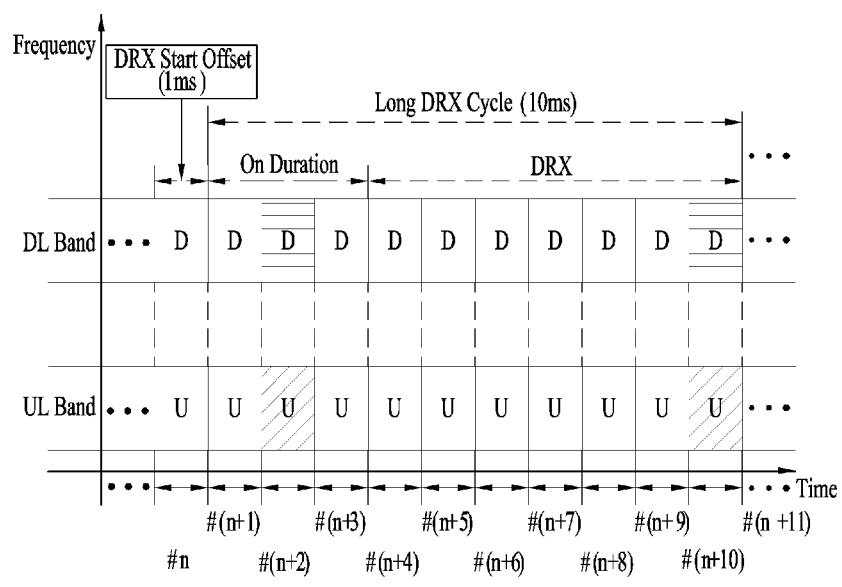
FIG. 15 is a reference diagram to describe a case of applying a $1^{st}$ method of the present invention.

FIG. 15 illustrates an example of a case of applying the $1^{st}$ method in the same situation in FIG. 14 (b). It is shown in FIG. 15 that if the present method is applied, an end time of onDurationTimer is changed into SF #(n+3) different from that (i.e., SF #(n+2)) in FIG. 14 (a).

<$2^{nd}$ Method>

According to the $2^{nd}$ method, a base station may be configured to additionally inform a user equipment of information on locations of subframes considered in counting of DRX operation related specific timers (i.e., onDuration-Timer, drx-InactivityTimer, drx-RetransmissionTimer) through a predefined signal (e.g., physical layer signal, high layer signal, etc.).

In this case, the corresponding information (i.e., the information on the location of the subframes considered in the counting of the DRX operation related specific timers) can be implemented with a specific length of bit-map (e.g., subframes situated in the locations corresponding to values set to 1 on the bit-map may be considered in the counting of the DRX operation related specific timers). Moreover, the corresponding information may be configured to be updated based on a predefined period.

Moreover, a predefined control channel (e.g., PDCCH, EPDCCH, R-PDCCH, etc.) may be configured to be transmitted in the subframes, which are configured through the information (i.e., the information on the location of the subframes considered in the counting of the DRX operation related specific timers), considered in the counting of the DRX operation related specific timers.

Additionally, a D2D UE may be configured to actually perform an operation of monitoring the predefined control channel (e.g., PDCCH, EPDCCH, R-PDCCH, etc.) only in the locations of the subframes considered in the counting of the DRX operation related specific timers.

Figure 16:
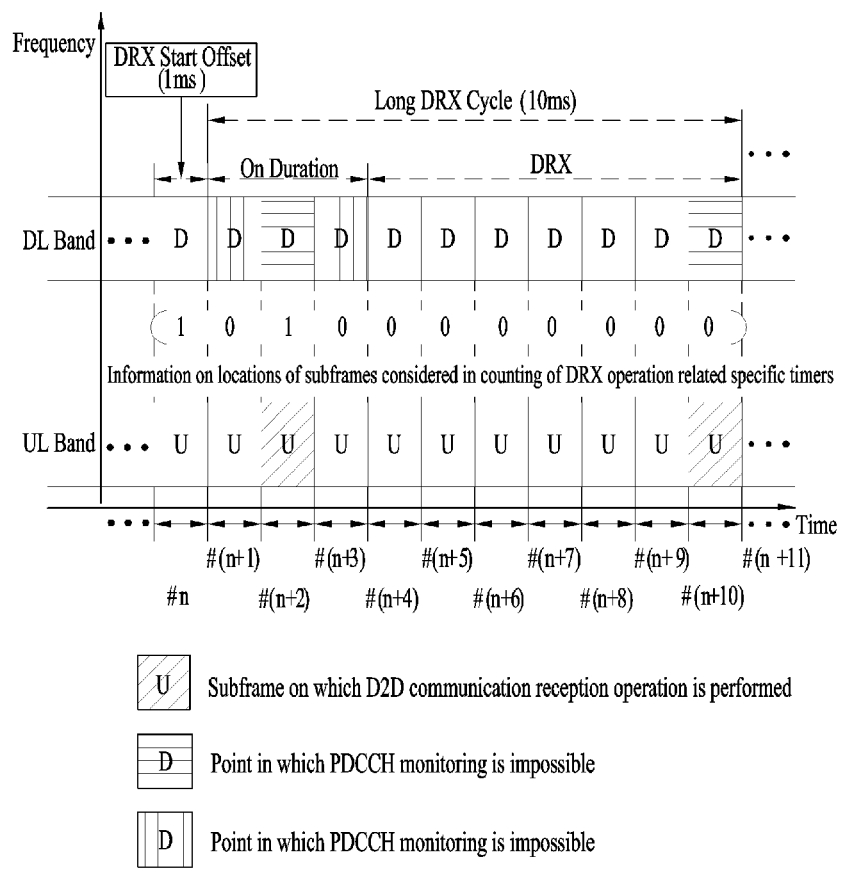
FIG. 16 is a reference diagram to describe a case of applying a $2^{nd}$ method of the present invention.

FIG. 16 is a reference diagram to describe a case of applying the $2^{nd}$ method in the same situation in FIG. 14 (b). It is assumed in FIG. 16 that the information, which is informed the user equipment by the base station, on the location of the subframes considered in the counting of the DRX operation related specific timers (i.e., onDuration-Timer, drx-InactivityTimer, drx-RetransmissionTimer) is implemented with 10 bits of bit-map. And, it is also assumed in FIG. 16 that the corresponding information is set to '1010000000'.

Further, if a user equipment receives the above information (i.e., '1010000000'), the user equipment is configured to assume that a start time of applying the corresponding information is equal to a start time of DRX Cycle (or a start time of On Duration) (in FIG. 16). Alternatively, a base station may be configured to additionally transmit a user equipment of information on the start time of applying the corresponding information through a predefined signal (e.g., physical layer signal, high layer signal, etc.)

<$3^{rd}$ Method>

According to a $3^{rd}$ method, DRX operation related specific timers (i.e., onDurationTimer, drx-InactivityTimer, drx-RetransmissionTimer) may be configured to count in a manner of considering the number of downlink subframes and/or special subframes including DwPTS without consideration of the above-mentioned subframes (e.g., D2D signal reception operation and/or D2D signal transmission operation related times) configured for the purpose of D2D communication. In other words, according to the $3^{rd}$ method, the DRX operation related specific timers (i.e., onDuration-Timer, drx-InactivityTimer, drx-RetransmissionTimer) can be interpreted as counted irrespective of whether a predefined control channel (e.g., PDCCH, EPDCCH, R-PDCCH, etc.) can be (actually) monitored or as counted without distinguishing a downlink subframe and/or a specific subframe including DwPTS in which the predefined control channel can be monitored.

Moreover, in case that the $3^{rd}$ method is applied, a D2D UE may be configured to perform a monitoring operation for the predefined control channel only in locations of subframe in which the corresponding control channel (e.g., PDCCH, EPDCCH, R-PDCCH, etc.) can be actually monitored. For instance, the D2D UE may be configured to perform the monitoring operation for the control channel only in i) a different time of a downlink subframe (and/or a special subframe including DwPTS) not overlapped at least partially (i.e., partially or fully) with subframes (i.e., subframes on which the D2D UE should actually perform a D2D signal transmission/reception operation) configured for usage of D2D communication or ii) a different location of a downlink subframe (and/or a special subframe including DwPTS) not overlapped at least partially (partially of fully) with a time at which the D2D UE should actually perform a D2D signal reception operation.

Alternatively, a base station may be configured to transmit predefined control channels (e.g., PDCCH, EPDCCH, R-PDCCH, etc.) by considering locations of subframes, in which the corresponding control channel can be monitored, of individual D2D UEs, respectively.

Figure 17:
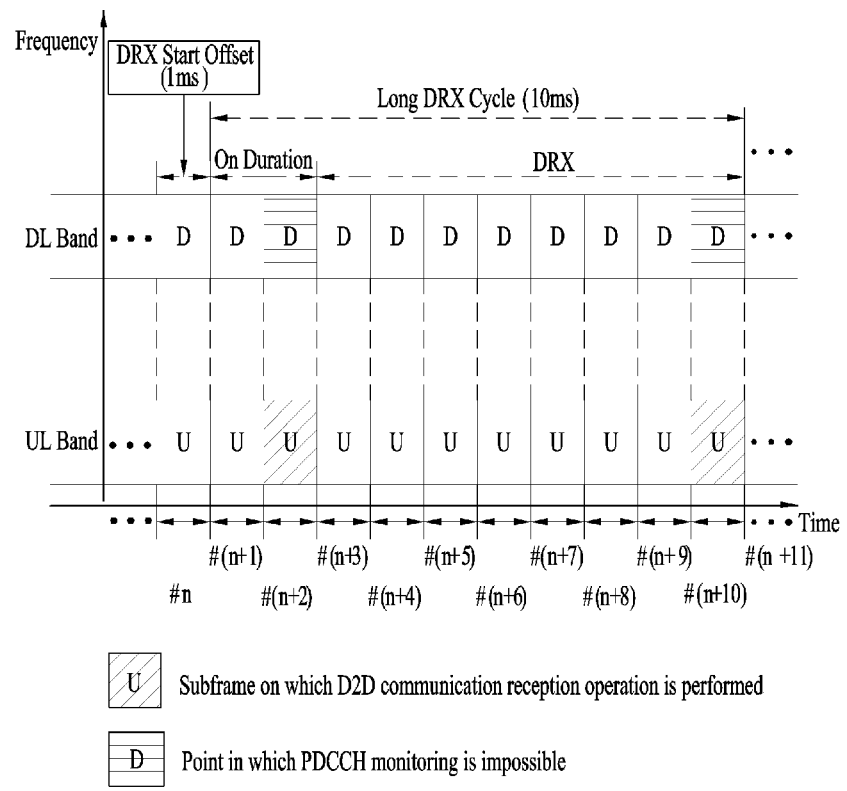
FIG. 17 is a reference diagram to describe a case of applying a $3^{rd}$ method of the present invention.

FIG. 17 illustrates one example of a case of applying the $3^{rd}$ method in the same situation in FIG. 14 (b). It can be seen in FIG. 17 that if the $3^{rd}$ method is applied, an end time of onDurationTimer is equal to that (i.e., SF #(n+2)) in FIG. 14 (a).

<$4^{th}$ Method>

According to a $4^{th}$ method, in case that subframes (e.g., a downlink subframe and/or a special subframe including DwPTS in which a predefined control channel is transmitted) overlapped at least partially (i.e., partially or fully) with (some or all) subframes configured for usage of D2D communication based on the above-mentioned $1^{st}$ and $2^{nd}$ methods are excluded from counting of DRX operation related specific timers (i.e., onDurationTimer, drx-Inactivi-tyTimer, drx-RetransmissionTimer), a DRX Cycle interval (e.g., Short DRX Cycle interval, Long DRX Cycle interval) may be configured to be extended as the number of the excluded subframes.

In this case, when the $4^{th}$ method is applied, a previously signaled DRX Cycle value (e.g., Short DRX Cycle value, Long DRX Cycle value) can be interpreted as extended virtually. In particular, according to the $4^{th}$ method, power saving effect due to a DRX operation of a D2D UE can be guaranteed at a certain level.

Moreover, the $4^{th}$ method may be configured to be limitedly applied to some timers (e.g., onDurationTimer) among the DRX operation related specific timers (i.e., onDurationTimer, drx-InactivityTimer, drx-RetransmissionTimer) to be counted in consideration of the downlink subframe and/or the special subframe including DwPTS in which the predefined control channel (e.g. PDCCH, EPDCCH, R-PRDCCH, etc.) is transmitted (or in which the predefined control channel can be monitored).

Figure 18:
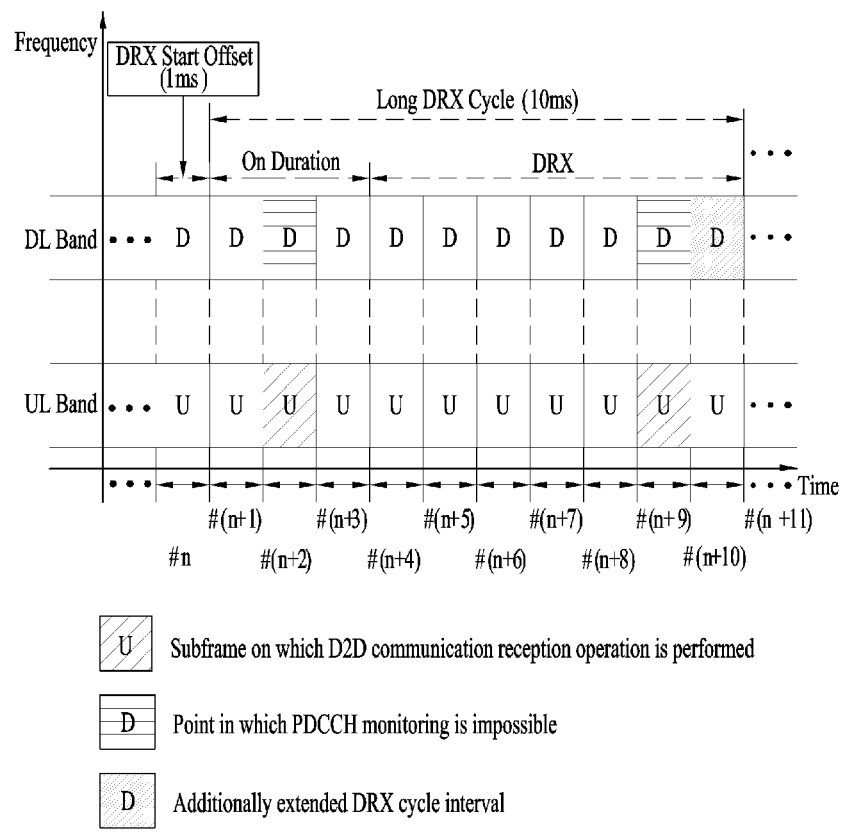
FIG. 18 illustrates a case of applying a $4^{th}$ method of the present invention.

FIG. 18 illustrates a case of applying the $4^{th}$ method in the same situation in FIG. 15 or FIG. 16. It can be seen in FIG. 18 that an end time of Long DRX Cycle is changed into SF #(n+11) different from that (i.e., SF #(n+10)) in FIG. 15 or FIG. 16. In other words, FIG. 18 shows that considering that a downlink subframe (in which a predefined control channel is transmitted) overlapped at least partially (i.e., partially or fully) with SF #(n+2) configured for usage of D2D communication in FIG. 15 or FIG. 16 is excluded from counting of a DRX operation related specific timer (i.e., onDurationTimer), an existing DRX Cycle interval (Long DRX Cycle interval) is extended as the number of the excluded subframes (i.e. 1 subframe).

<$5^{th}$ Method>

According to a $5^{th}$ method, the aforementioned $1^{st}$ to $4^{th}$ methods may be configured to be extensively applied to some (or all) DRX operation related parameters in the following description as well as DRX operation related specific timers (i.e., onDurationTimer, drx-InactivityTimer, drx-RetransmissionTimer) counted in consideration of a downlink subframe and/or a special subframe including DwPTS in which a predefined control channel (e.g., PDCCH, EPDCCH, R-PDCCH, etc.) is transmitted (or in which the predefined control channel can be monitored).

drxShortCycleTimer, HARQ round trip timer, HARQ RTT timer, mac-ContentionResolutionTimer shortDRX-Cycle, longDRX-Cycle, drxStartOffset <$6^{th}$ Method>

According to a $6^{th}$ method, when the aforementioned $1^{st}$ to $5^{th}$ methods are applied, a DRX command MAC control element (CE) transmission related to a stop operation of onDurationTimer and/or a stop operation of drx-InactivityTimer may be configured to be performed in locations of subframes in which a D2D UE can actually perform monitoring of a predefined control channel (e.g., PDCCH, EPDCCH, R-PDCCH, etc.).

For instance, the DRX command MAC CE transmission may be performed only in a different time of a downlink subframe (and/or a special subframe including DwPTS) not overlapped at least partially (i.e., partially or fully) with subframes (i.e. subframes in which a D2D UE should actually perform a D2D signal transmission/reception operation) configured for usage of D2D communication or a different location of a downlink subframe (and/or a special subframe including DwPTS) not overlapped at least partially (i.e., partially or fully) with a time at which a D2D UE should actually perform a D2D signal reception operation.

In this case, according to the $6^{th}$ method, reception error (false alarm) probability of the DRX command MAC CE of the D2D UE can be decreased and stable DRX command MAC CE transmission can be also achieved.

Alternatively, the DRX command MAC CE transmission may be configured to be performed only in locations of subframes in which the D2D UE can actually monitor the predefined control channel except at least one selected from the group consisting of i) On Duration related time, ii) DRX Inactivity related time, and iii) DRX Retransmission related time, which are additionally configured (or extended) through the $1^{st}$ to $5^{th}$ methods.

For instance, in FIG. 16 (i.e., an example of a case of applying the $1^{st}$ method in the same situation in FIG. 14 (b)), the DRX command MAC CE can be transmitted only in SF #(n+1) except SF #(n+3) corresponding to the On Duration related time additionally configured (or extended) through the $1^{st}$ method.

<$7^{th}$ Method>

According to a $7^{th}$ method of the present invention, at least one among the aforementioned $1^{st}$ to $6^{th}$ methods may be configured to be limitedly applied only to some predefined cases (or some parameters). In this case, embodiments of the $7^{th}$ method are as follows.

The present invention may be configured to be limitedly applied only for counting of a specific timer (i.e., onDurationTimer and/or drx-InactivityTimer and/or drx-RetransmissionTimer).

The present invention may be configured to be limitedly applied only for a specific type of DRX Cycle (i.e., Long DRX Cycle and/or Short DRX Cycle).

The present invention may be configured to be limitedly applied only to a case in which Active Time (when DRX Cycle is configured) is set up by reflecting some predefined cases. For instance, the present invention may be configured to be limitedly applied only to a case in which Active Time is set up by reflecting some predefined cases consisting of i) Time while onDurationTimer or drx-InactivityTimer or drx-RetransmissionTimer or mac-ContentionResolutionTimer is running, ii) Time while a Scheduling Request is sent on PUCCH and is pending, iii) Time while an uplink grant for a pending HARQ retransmission can occur and there is data in the corresponding HARQ buffer, and iv) Time while a PDCCH indicating a new transmission addressed to the C-RNTI of the UE has not been received after successful reception of a Random Access Response for the preamble not selected by the UE.

The present invention may be configured to be limitedly applied only for a user equipment having a D2D communication mode (e.g., D2D data transmission/reception operation mode and/or D2D discovery signal transmission/reception mode) configured therein.

The present invention may be configured to be limitedly applied only to a specific type of D2D communication (e.g., Group-Cast D2D communication, Uni-Cast D2D communication, Broad-cast D2D communication) and/or a specific type of a D2D communication scenario (e.g., D2D Discovery/Communication Within Network Coverage, D2D Discovery/Communication Outside Network Coverage (for Public Safety Only), D2D Discovery/Communication of Partial Network Coverage).

The present invention may be configured to be limitedly applied only for a user equipment having a UE (D2D) relay mode configured therein and/or a user equipment operating (configured) as a cluster head.

The present invention may be configured to be limitedly applied only for a DRX operation based on a specific type of a control channel (e.g., PDCCH and/or EPD-CCH and/or R-PDCCH).

The present invention may be configured to be limitedly applied only for RRC_CONNECTED mode (and/or IDLE mode) of a user equipment.

The present invention may be configured to be limitedly applied only to a case in which D2D communication is configured to be performed in a specific band (e.g., a UL band in an FDD system).

The present invention may be configured to be limitedly applied only to a case of performing at least one transmission/reception operation selected from the group consisting of D2D data channel, D2D scheduling assignment, (SA), D2D discovery, D2DSS (D2D synchronization signal) (e.g., primary D2DSS, secondary D2DSS), and PD2DSCH (physical D2D synchronization channel).

The present invention may be configured to be limitedly applied only to a case in which timing reference of D2D signal/channel transmission is determined based on WLAN UL timing with a base station or WLAN DL timing with a base station.

Since the examples of the present invention can be also included as one of implementing methods of the present invention, it is apparent that the examples are considered as embodiments of the present invention. Moreover, it may be able to implement each of the aforementioned embodiments/configurations/methods not only independently but also combining (or merging) at least one of embodiments/configurations/methods. Furthermore, information on the aforementioned embodiments/configurations/methods of the present invention or information on whether the embodiments/configurations/methods are applied can be informed a user equipment by a base station through a predefined signal (e.g., physical layer or high layer signal).

Figure 19:
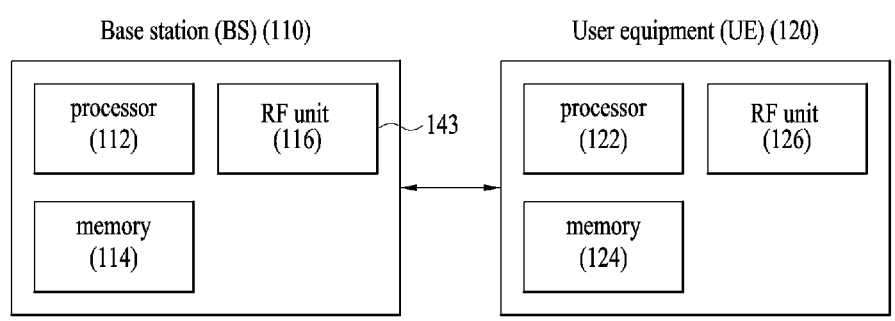
FIG. 19 is a diagram of a base station and a user equipment applicable to one embodiment of the present invention.

FIG. 19 is a diagram of a base station and a user equipment applicable to one embodiment of the present invention.

If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 19, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of supporting discontinuous reception in a wireless communication system supporting usage change of a radio resource and apparatus therefor are mainly described with reference to the examples of applying to 3GPP LTE system in the foregoing description, the present invention is applicable to various kinds of wireless communication systems as well as to the 3GPP LTE system.

What is claimed is:

1. A method of monitoring a downlink control channel by a user equipment performing D2D (device-to-device) communication in a wireless communication system, the method comprising:
    receiving information of a plurality of first subframes for counting a DRX (discontinuous reception) timer via a high layer signaling, wherein the first subframes are located so as not to overlap with second subframes for D2D signal transmission;
    monitoring the downlink control channel at the plurality of first subframes; and
    counting the DRX timer, when the monitoring the downlink control channel is performed on the plurality of first subframes.

2. The method of claim 1, wherein one of the second subframes for the D2D signal transmission is determined by applying a timing advance (TA).

3. The method of claim 1, wherein the DRX timer comprises one selected from the group consisting of an onDurationTimer, a drx-InactivityTimer and a drx-Retransmission Timer.

4. The method of claim 1, wherein a DRX cycle interval is extended according to the number of second subframes.

5. The method of claim 1, wherein the DRX timer comprises one selected from the group consisting of a drxShortCycleTimer, an HARQ round trip timer, an HARQ RTT timer, a mac-ContentionResolutionTimer, a shortDRX-Cycle, a longDRX-Cycle, and a drxStartOffset.

6. The method of claim 1, wherein a stop operation of the DRX timer is determined according to a DRX command medium access control (MAC) control element, and
    wherein the DRX command MAC control element is received in only the first subframes.

7. A user equipment for monitoring a downlink control channel and performing D2D (device-to-device) communication in a wireless communication system, the UE comprising:
    a radio frequency unit; and
    a processor coupled to the radio frequency unit to transceive a signal,
    wherein the processor is configured to:
        receive information of a plurality of first subframes for counting a DRX (discontinuous reception) timer via a high layer signaling, wherein the first subframes are located so as not to overlap with second subframes for D2D signal transmission,
        monitor the downlink control channel at the plurality of first subframes, and
        count the DRX timer, when the monitoring the downlink control channel is performed on the plurality of first subframes.

* * * * *